US008360845B1

(12) United States Patent
Hsu

(10) Patent No.: US 8,360,845 B1
(45) Date of Patent: Jan. 29, 2013

(54) APPARATUS FOR ROULETTE TABLE GAMES WITH DYNAMIC RAISED ODDS

(76) Inventor: Tien-Shu Hsu, Taichung (TW)

( * ) Notice: Subject to any disclaimer, the term of this patent is extended or adjusted under 35 U.S.C. 154(b) by 0 days.

(21) Appl. No.: 13/288,702

(22) Filed: Nov. 3, 2011

(51) Int. Cl.
*A63F 9/24* (2006.01)
*A63F 13/00* (2006.01)

(52) U.S. Cl. ................................ 463/17; 463/16; 463/25

(58) Field of Classification Search .............. 463/16–20, 463/25, 29; 273/142 E, 142 R, 143 R, 274
See application file for complete search history.

(56) References Cited

U.S. PATENT DOCUMENTS 5,857,909 A * 1/1999 Rubin ............................ 463/17
6,659,866 B2 * 12/2003 Frost et al. ...................... 463/17
6,921,072 B2 * 7/2005 Hughes-Watts .......... 273/142 E
8,007,355 B2 * 8/2011 Grubmuller .................... 463/17
8,029,351 B2 * 10/2011 Kosaka et al. .................. 463/17
2003/0153384 A1 * 8/2003 Duhamel ......................... 463/29
2010/0009744 A1 * 1/2010 Mugnolo et al. ................ 463/27
2011/0180991 A1 * 7/2011 Hsu ............................... 273/274

* cited by examiner

*Primary Examiner* — Milap Shah
(74) *Attorney, Agent, or Firm* — Muncy, Geissler, Olds & Lowe, PLLC

(57) ABSTRACT

An apparatus for roulette table games aims to dynamically increase payout odds of a roulette table game. The apparatus includes an electronic display panel which has at least one display zone to indicate a corresponding betting area and display a dynamic raised odds. Banker can give a payout for player's bet according to the dynamic raised odds. By providing frequent changes of the dynamic raised odds which might be greater than the payout odds of the betting area the odds is greater, therefore increases the expected value of the roulette table game and offers more incentives for players to continuously place bets. The players are motivated to expect extra awards from the roulette table game, hence the appeal of the game is greater. As a result higher utilization of roulette table game can be achieved and idle time can be reduced to avoid wastes.

7 Claims, 5 Drawing Sheets

APPARATUS FOR ROULETTE TABLE GAMES WITH DYNAMIC RAISED ODDS

FIELD OF THE INVENTION

The present invention relates to a roulette table game and particularly to an apparatus to increase appeal of roulette table games.

BACKGROUND OF THE INVENTION

Roulette table games provide many appealing features such as higher odds, simple to play and less cheating chance, thus are quite popular among players. They mainly rely on a wheel and a colored ball for playing. The wheel is divided into thirty seven pockets marked by numbers from 0 to 36. During playing the wheel is driven to spinning and the colored ball is cast to spin with the wheel until losing the spinning momentum and falling on one of the 37 pockets. In order to match at least one of a plurality of game results, the roulette table game also provides a betting table to allow players to place bets according to different game results. The betting table offers different payout odds for the different game results based on their appearing probability. In the event that the game result matches a player's bet, a payout based on the payout odds and player's wager is made to the player.

The present common roulette table game usually has the game results shown in a single number, odd number, even number, designated numbers or the like. Different game results have official payout odds. For instance, if the game result is any one of single numbers among "1-36", the odds generally is 35 to 1, and the converted player's profit rate is about 94.59%.

Due to player's profit rate of betting the game results of various roulette table games is constant and lower than 100%, after a period of time the players could feel bored and not eager to participate. Hence after the novelty and excitement of the game decline, utilization of the roulette table games gradually decreases and results in not satisfactory business outcome.

SUMMARY OF THE INVENTION

The primary object of the present invention is to provide an apparatus to dynamically increase odds of roulette table games.

To achieve the foregoing object the invention provides an apparatus for roulette table games that allows a banker and a player to play a table game. It includes a wheel, a colored ball, a betting table and an electronic display panel. The wheel is divided into a plurality of pockets. During playing the wheel is driven to spinning and the colored ball is cast to spin with the wheel until losing the spinning momentum and falling on any one of the pockets to match at least one of a plurality of game results. The probability of generating the game results is defined as a game probability.

The betting table has a plurality of betting areas to match various game results. The betting areas allow the player to place bets each has a payout odds. The multiplication product of the game probability and payout odds is player's profit rate. The payout odds has a given value and is controlled so that the player's profit rate is no greater than 100%.

The electronic display panel displays at least one display zone corresponding to the betting areas. The display zone displays a dynamic raised odds to give the banker priority to choose the higher one between the payout odds and dynamic raised odds as the payout for the player's betting. The dynamic raised odds is any one selected from a plurality of raised odds. The actual values and number of the raised odds can be randomly reset and given anew at the beginning of the roulette table game. I.e., at the start of each game the actual values and number of the raised odds can be changed to meet use requirements.

Moreover, each of the raised odds has its appearing probability. The sum of multiplication products of all the raised odds and the corresponding appearing probability is an accumulated average odds. The multiplication product of the accumulated average odds and the game probability is a player's raised profit rate. All the raised odds and the corresponding appearing probability thereof can be controlled and adjusted to make the player's raised profit rate approximating a given targeted value.

Thus, through the apparatus of the invention the payout odds of the game results can be substituted by the dynamic raised odds, I.e., the player who wins the bet can get the payout based on the dynamic raised odds with an increased player's profit rate. In addition, the dynamic raised odds are appeared and changed frequently, thus offer more appeal and excitements for the player to place bets, therefore utilization of the roulette table game can be enhanced to maximize business benefit. By controlling the player's raised profit rate within an acceptable range, desired business benefit can be maintained while utilization of the roulette table increases.

The foregoing, as well as additional objects, features and advantages of the invention will be more readily apparent from the following detailed description, which proceeds with reference to the accompanying embodiments and drawings. The embodiments serve merely for illustrative purpose and are not the limitations of the invention.

DETAILED DESCRIPTION OF THE PREFERRED EMBODIMENTS

Figure 1:
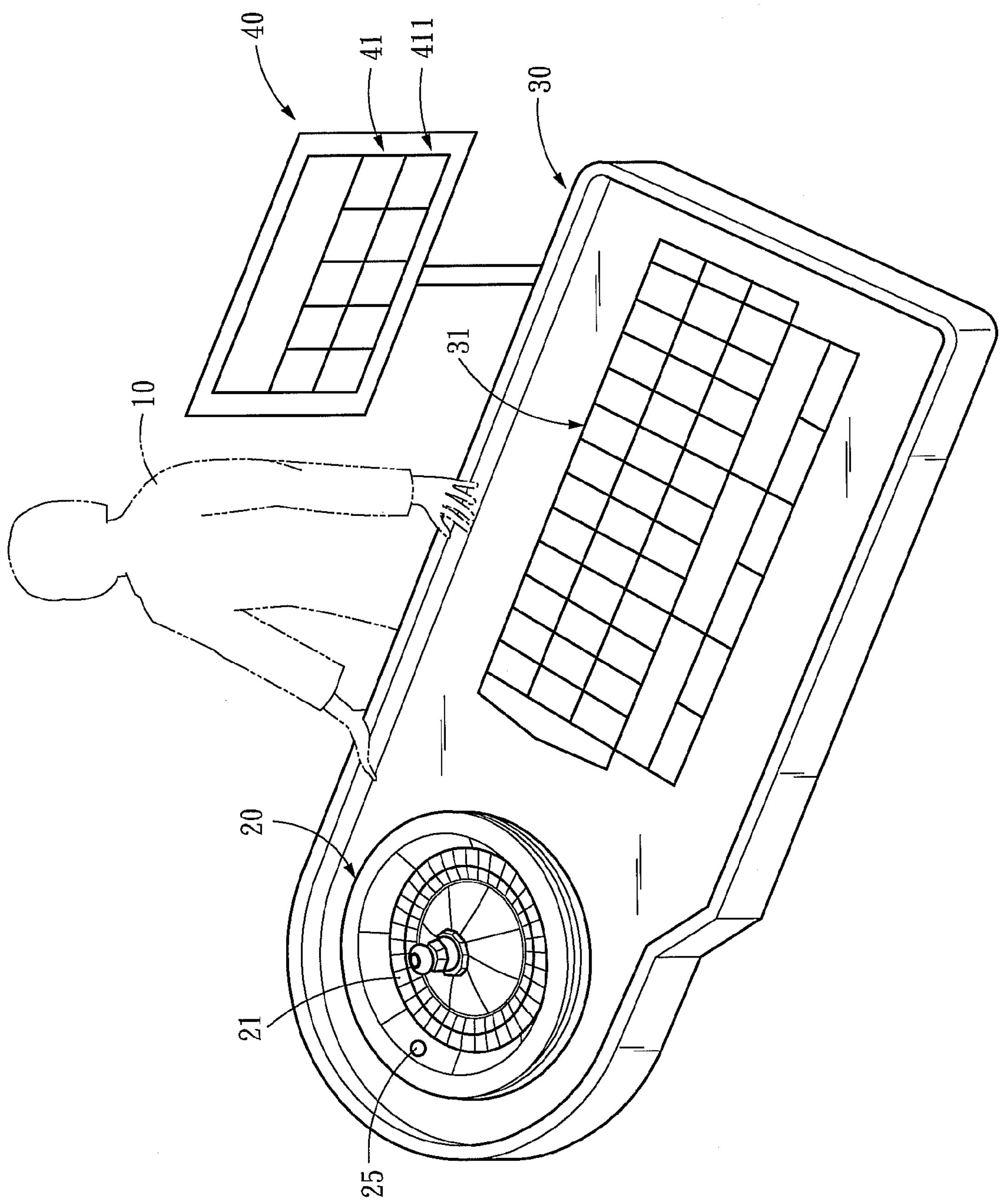
FIG. 1 is a schematic view of an embodiment of a real table of the invention.
Figure 2:
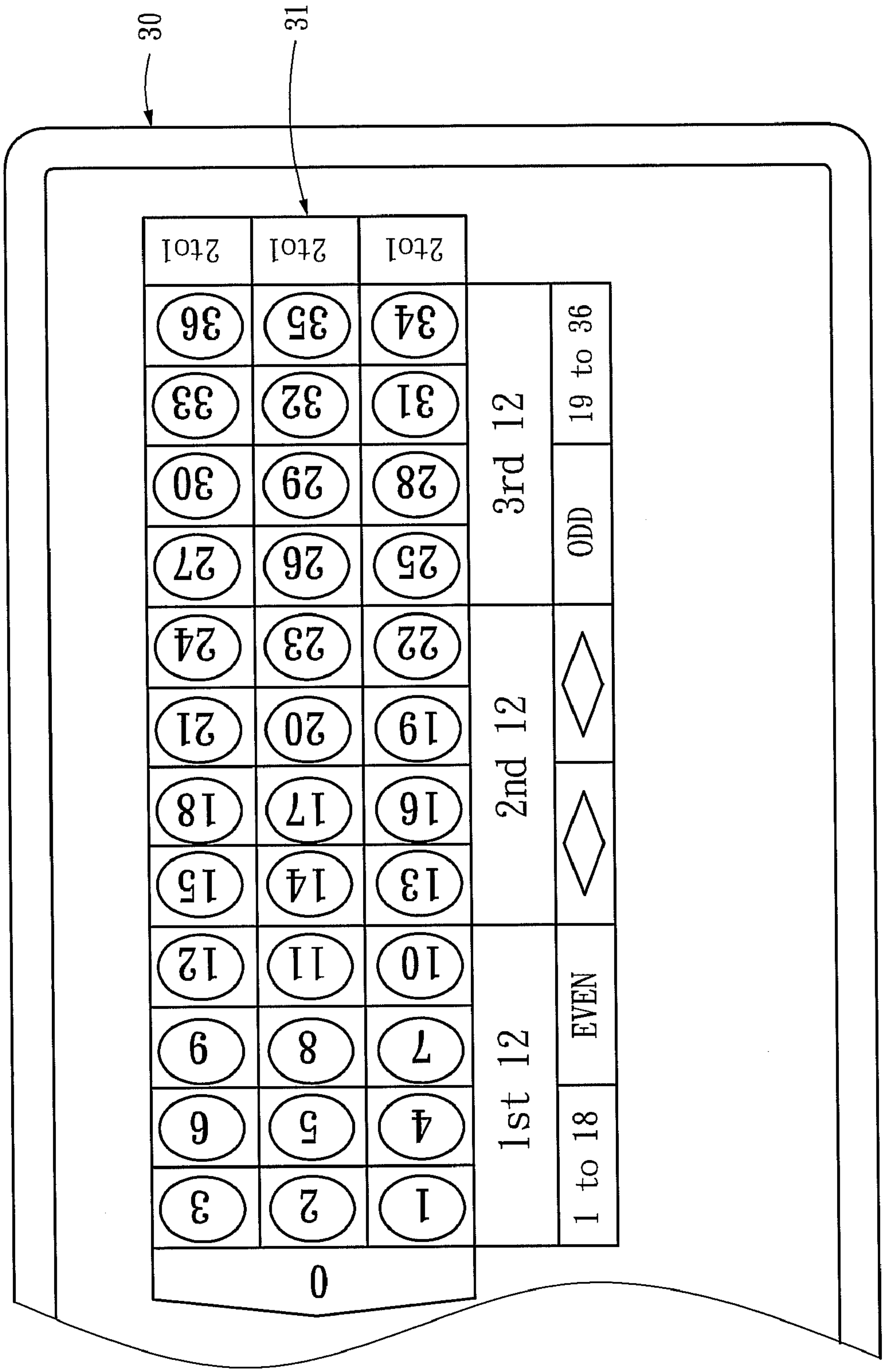
FIG. 2 is a schematic view of a betting table on a real table of the invention.
Figure 3:
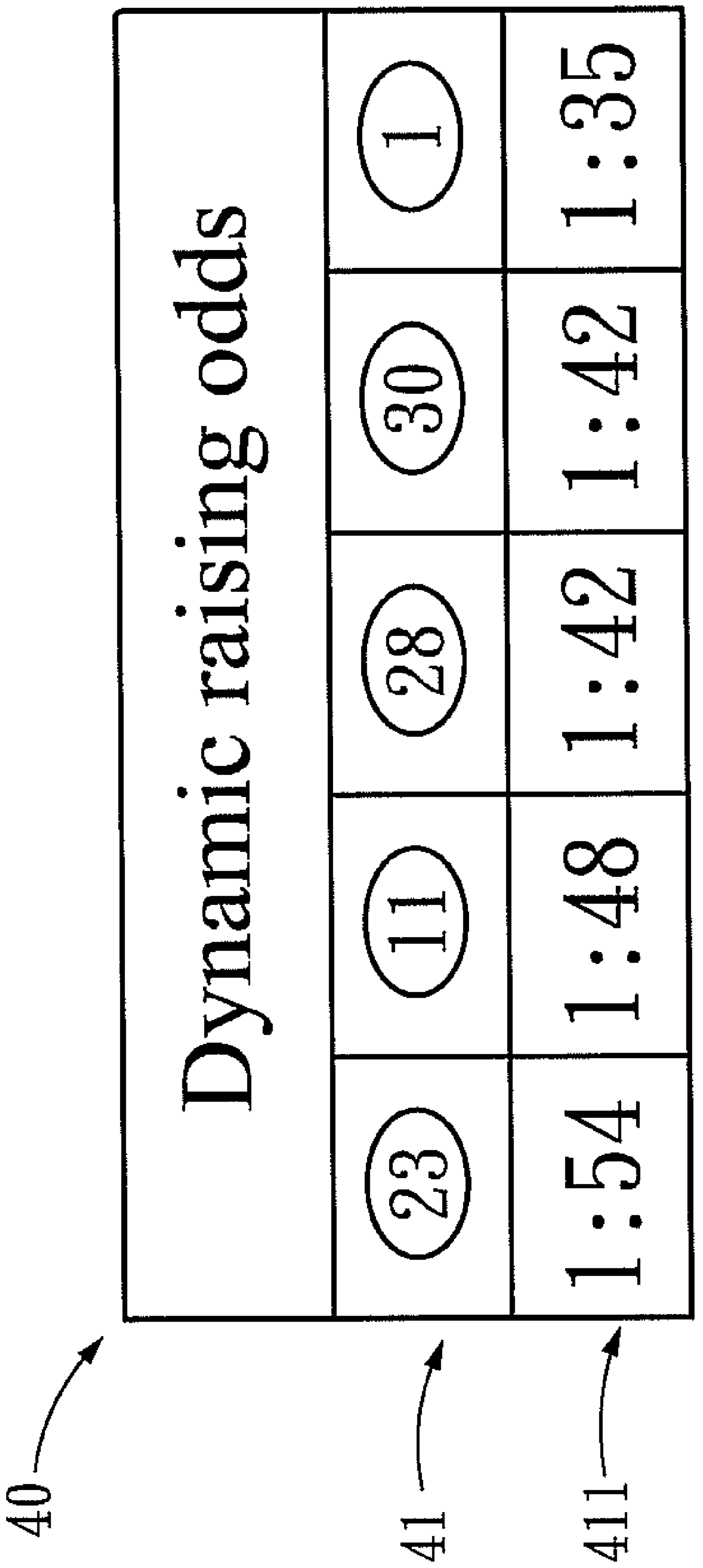
FIG. 3 is a schematic view of an electronic display panel of the invention.

Please referring to FIGS. 1, 2 and 3, the present invention aims to provide an apparatus for a banker 10 and a player (not shown in the drawings) to play a roulette table game. In an embodiment shown in the drawings, the apparatus includes a wheel 20, a colored ball 25, a betting table 30 and an electronic display panel 40. The wheel 20 is divided into a plurality of pockets 21. In this embodiment, the wheel 20 has 37 pockets 21 marked by numbers from 0 to 36. During playing the wheel 20 is driven to spinning and the colored ball 25 is cast to spin with the wheel 20 until losing the spinning momentum and falling on any one of the 37 pockets to match at least one of a plurality of game results. The probability of generating the game results is defined as a game probability.

Figure 4:
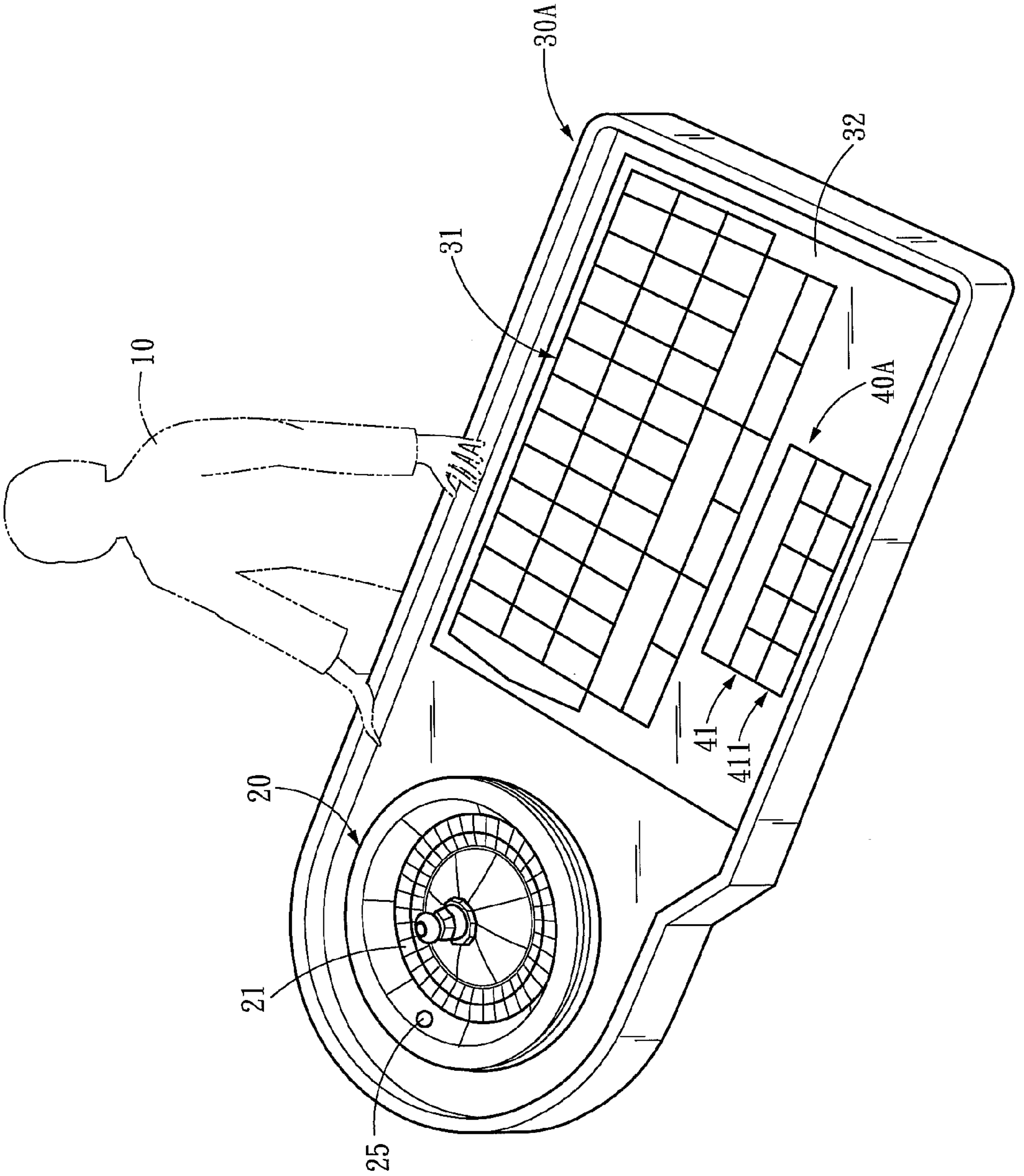
FIG. 4 is a schematic view of an embodiment of an electronic table of the invention.
Figure 5:
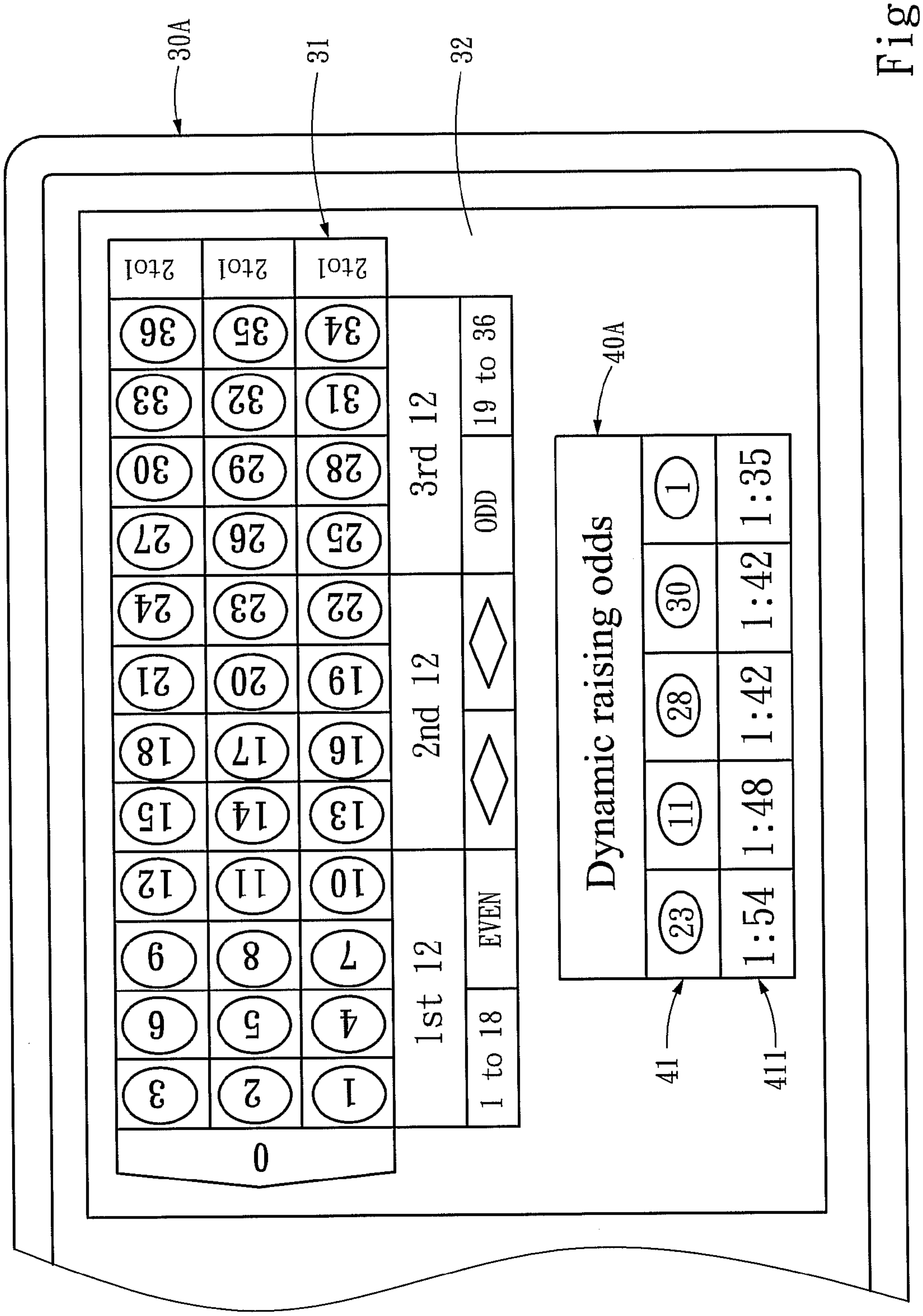
FIG. 5 is a schematic view of a betting table of an electronic table of the invention.

The betting table 30 can be formed by at least two types. FIG. 1 shows one type in which the betting table 30 is a real table with a plurality of betting areas 31 to indicate the game results. The betting areas 31 are printed and labeled on the surface of the table. FIGS. 4 and 5 illustrate another type with the betting table 30A being an electronic table containing an electronic screen 32 to display the betting areas 31. The electronic screen 32 can be a touch screen.

The betting areas 31 allow the player to place bets each has a payout odds. The multiplication product of the game probability and payout odds is player's profit rate. The payout odds is a given value and controlled so that the player's profit rate is no greater than 100%. Depending on differences of game rules, the payout odds can be divided into returning player's bet and no-return of player's bet. The aforesaid calculation of player's profit rate includes returning player's bet in the payout odds, namely, the payout odds is equal to the multiple taken by the player upon winning the bet. If the payout odds does not include returning player's bet, the player's profit rate is modified to become the multiplication product of the sum of the payout odds and double of the bet (i.e. player's actual taking multiple upon winning the bet) with the game probability.

When the betting table 30 is a real table, the electronic display panel 40 can be mounted upright at one side of the betting table 30 (referring to FIG. 1). When the betting table 30A is electronic the electronic display panel 40A can be incorporated in the electronic screen 32 of the betting table 30A (referring to FIG. 4).

The electronic panel 40 includes at least one display zone 41 corresponding to the betting areas 31. The display zone 41 displays a dynamic raised odds 411 to give the banker priority to choose a higher one between the payout odds and dynamic raised odds 411 as the payout for player's bet. The dynamic raised odds 411 is anyone selected from multiple raised odds. The values and number of the raised odds are set by the banker. Each of the raised odds has an appearing probability. The accumulation sum of the multiplication products of the raised odds and their corresponding appearing probability is defined as an accumulated average odds. The multiplication product of the accumulated average odds and game probability is a player's raised profit rate. The raised odds and their corresponding appearing probability can be controlled and adjusted to make the player's raised profit rate approximating a set target value.

Similarly, if the dynamic raised odds 411 does not include returning the player's bet, the player's raised profit rate is modified to become the multiplication product of the accumulated average odds plus double of the bet (i.e. actual multiple taken by the player upon winning the bet) with game probability.

Take a game result of having the colored ball 25 landed in the pocket "1" of the wheel 20 as an example for discussion. The appearing probability is 1/37, the payout odds generally is 1 pays 35 (including returning player's bet); after calculation, the player's profit rate is about 94.59%, and the set target value is 96% (i.e. house's benefit is 4%, determined by the house). The number of raised odds (including returning player's bet) selectable for the dynamic raised odds 411 is 4, at values of 1 pays 35, 1 pays 42, 1 pays 48 and 1 pays 54; and their corresponding appearing probability are processed and adjusted to become 95%, 3%, 1% and 1%, namely, the appearing probability is 95% for 1 pay 35, 3% for 1 pays 42, 1% for 1 pays 48, and 1% for 1 pays 54. Incorporated the aforesaid values, the player's raised profit rate is processed as follow:

$$(35*95\%+42*3\%+48*1\%+54*1\%)*1/37=96.03\%$$

The player's raised profit rate approximates 96%, thus can meet requirements.

The aforesaid approach of generating the dynamic raised odds 411 can be adopted to other games results to generate different raised odds with varying appearing probability.

After the player has placed a bet on the betting areas 31 of the betting table 30, the dynamic raised odds 411 can be generated, and according to the appearing probability of the raised odds the value thereof can be determined. FIG. 3 illustrates the values of selected raised odds according to the dynamic raised payout odds 411 of a different game result based on an embodiment of the invention. The values can be reset anew at the beginning of each game to generate new values.

When the number of the betting areas 31 is not many the electronic display panel 40 can contain sufficient display zones 41 to mate the betting areas 31 in an one-to-one fashion. In the event that a greater number of the betting areas 31 exist (with the number of the display zones 41 smaller than that of the betting areas 31), a free choice is provided as required, and the display zones 41 can be dynamically selected to mate the betting areas 31, and the raised odds with values different from the previous payout odds is selected at a higher priority.

As a conclusion, the invention can substitute the payout odds with the dynamic raised odds so that players can get the payout according to the dynamic raised odds upon winning the bet, thus get a higher profit rate. Moreover, the dynamic raised odds appear and change frequently, hence the game is more exciting and appealing to the players and offers more incentive for the players to place bets. As a result, utilization of the roulette table increases. The player's profit rate can be controlled within an acceptable range so that due business benefit can be maintained intact.

What is claimed is:

1. An apparatus for roulette table games allowing a banker and a player to play a roulette table game, comprising:

a wheel divided into multiple pockets;

a colored ball cast into the wheel during spinning and spinning therewith until losing the spinning momentum and falling on the wheel within any one of the multiple pockets to match at least one of a plurality of betting areas, each having a respective probability combined to define an overall game probability;

a betting table which includes the plurality of betting areas that allow the player to place one or more bets and includes a payout odds for each of the plurality of betting areas to form a multiplication product by multiplying with the overall game probability to become a player's profit rate which is not greater than 100%, by controlling the payout odds; and an electronic display panel to display at least one display zone corresponding to the plurality of betting areas and displaying a plurality of dynamic raised odds;

wherein, the banker selects, via an input device coupled to the electronic display panel, a selection of a higher one between the payout odds and one of the plurality of dynamic raised odds as a payout for a player's bet corresponding to one of the plurality of betting areas;

wherein, the selected one of the plurality of dynamic raised odds being any one selected from the plurality of dynamic raised odds each getting an appearing probability;

wherein, an accumulated average odds being defined as an accumulation sum of each of the multiplication products of the plurality of dynamic raised odds and each corresponding appearing probability;

wherein, a player's raised profit rate being defined as a multiplication product of the accumulated average odds and the overall game probability;

wherein, the player's raised profit rate is substantially equal to a set target value by controlling the plurality of dynamic raised odds and each corresponding appearing probability; and wherein, when the banker selects said one of the dynamic raised odds for the play of the roulette table game, the player's profit rate is adjusted to said player's raised profit rate for the corresponding betting area.

2. The apparatus for roulette table games of claim 1, wherein the multiple pockets comprise of 37 pockets marked by numbers from 0 to 36.

3. The apparatus for roulette table games of claim 1, wherein the electronic display panel is mounted upright at one side of the betting table.

4. The apparatus for roulette table games of claim 1, wherein the betting table includes an electronic screen and the plurality of betting areas are displayed on the electronic screen.

5. The apparatus for roulette table games of claim 4, wherein the electronic screen comprises a touch screen.

6. The apparatus for roulette table games of claim 4, wherein the electronic display panel is incorporated in the electronic screen of the betting table.

7. The apparatus for roulette table games of claim 1, wherein the selectable plurality of dynamic raised odds include definite values and numbers set anew by the player at the beginning of each play of the roulette table game.

* * * * *